US012748710B2

(12) United States Patent
Lee et al.

(10) Patent No.: US 12,748,710 B2
(45) Date of Patent: Sep. 29, 2026

(54) SLAVE DEVICE COMMUNICATING WITH MASTER DEVICE, AND OPERATION METHOD THEREOF

(71) Applicant: SAMSUNG ELECTRONICS CO., LTD., Suwon-si (KR)

(72) Inventors: Kyungkeun Lee, Suwon-si (KR); Bumjun Kim, Suwon-si (KR); Gyeongtaek Lee, Suwon-si (KR); Seunghan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/737,513

(22) Filed: Jun. 7, 2024

(65) Prior Publication Data

US 2025/0181534 A1 Jun. 5, 2025

(30) Foreign Application Priority Data

Dec. 4, 2023 (KR) ........................ 10-2023-0173428

(51) Int. Cl.
*G06F 11/30* (2006.01)
*G06F 13/362* (2006.01)
*G06F 21/31* (2013.01)

(52) U.S. Cl.
CPC .... *G06F 13/362* (2013.01); *G06F 2213/0016* (2013.01)

(58) Field of Classification Search
None
See application file for complete search history.

(56) References Cited

U.S. PATENT DOCUMENTS 5,117,430 A * 5/1992 Berglund ................ H04L 12/44 370/408
6,240,473 B1 * 5/2001 Houg .................. G06F 13/4213 710/313
6,912,607 B2 * 6/2005 Smith ................. G06F 13/4291 710/100
8,650,414 B2 * 2/2014 Jayakumar .......... G06F 11/3062 713/300
11,132,314 B2 9/2021 Maddukuri et al.
11,320,990 B2 5/2022 Gopal et al.
11,360,842 B2 6/2022 Song
11,543,967 B2 1/2023 Kachare et al.
11,687,237 B2 * 6/2023 Kim ...................... G06F 3/0604 711/154

(Continued)

FOREIGN PATENT DOCUMENTS

JP 2004-62759 A 2/2004
KR 10-0869248 B1 11/2008

*Primary Examiner* — Hyun Nam
(74) *Attorney, Agent, or Firm* — Sughrue Mion, PLLC

(57) ABSTRACT

Provided is a method of operating a slave device configured to communicate with a master device and to store a plurality of status flags corresponding to a plurality of device status records, respectively, the method including: receiving a first device status request from the master device; generating a first device status response, wherein based on a value of each status flag of the plurality of status flags, the first device status response includes either a first response type having a first packet capacity or a second response type having a second packet capacity smaller than the first packet capacity; and transmitting the first device status response to the master device.

20 Claims, 18 Drawing Sheets

(56) References Cited

U.S. PATENT DOCUMENTS

| | | | | |
|---|---|---|---|---|
| 12,613,828 | B2 * | 4/2026 | Dondini | G06F 13/4282 |
| 2006/0130693 | A1 * | 6/2006 | Teowee | F42B 3/122 102/215 |
| 2006/0187942 | A1 * | 8/2006 | Mizutani | H04L 47/803 370/428 |
| 2007/0088988 | A1 | 4/2007 | Gupta et al. | |
| 2008/0236432 | A1 * | 10/2008 | Teowee | F42D 1/055 102/215 |
| 2015/0365842 | A1 * | 12/2015 | Bellusci | H04Q 9/00 370/230 |
| 2018/0239540 | A1 | 8/2018 | Kachare et al. | |
| 2020/0371695 | A1 | 11/2020 | Gopal et al. | |
| 2021/0182136 | A1 | 6/2021 | Song | |
| 2021/0263868 | A1 | 8/2021 | Maddukuri et al. | |
| 2023/0214334 | A1 * | 7/2023 | Kirkpatrick | G06F 3/0613 710/113 |

* cited by examiner

FIG. 2

DSL

| | Status record type | Timestamp | Status Value | Reference Range | Status Flag |
|---|---|---|---|---|---|
| DSR1 | Temperature | 0x00AA | 0x0011 | RR1 | SF1 [0] |
| DSR2 | Power consumption | 0x00BB | 0x0022 | RR2 | SF2 [0] |
| ⋮ | ⋮ | ⋮ | ⋮ | ⋮ | ⋮ |
| DSRn | AUX power capacitor voltage | 0x00FF | 0x00nn | RRn | SFn [0] |

FIG. 3

DSL

| | Status record type | Timestamp | Status Value | Reference Range | Status Flag |
|---|---|---|---|---|---|
| DSR1 | Temperature | 0x00AA | 0x0011 | RR1 | SF1 [0] |
| DSR2 | Power consumption | 0x00CC | 0x0033 | RR2 | SF2 [1] |
| ⋮ | ⋮ | ⋮ | ⋮ | ⋮ | ⋮ |
| DSRn | AUX power capacitor voltage | 0x00FF | 0x00nn | RRn | SFn [0] |

SLAVE DEVICE COMMUNICATING WITH MASTER DEVICE, AND OPERATION METHOD THEREOF

CROSS-REFERENCE TO RELATED APPLICATION

This application is based on and claims priority to Korean Patent Application No. 10-2023-0173428, filed in the Korean Intellectual Property Office on Dec. 4, 2023, the entire contents of which are incorporated herein by reference.

BACKGROUND

1. Field

The present disclosure relates to a communication system. More particularly, the present disclosure relates to a slave device included in a communication system, and an operation method thereof.

2. Description of the Related Art

A communication system may include a master device and a slave device. The slave device may collect a plurality of device status records. The slave device may transmit the plurality of collected device status records to the master device in response to a request from the master device. The master device may control an operation of the slave device based on the plurality of device status records.

However, when the slave device transmits all of the plurality of collected device status records, a capacity of packets transmitted through a channel between the slave device and the master device may be excessively large.

SUMMARY

Provided is a slave device configured to transmit device status records through a packet having smaller capacity, and an operation method thereof.

According to an aspect of the disclosure, a method of operating a slave device configured to communicate with a master device and to store a plurality of status flags corresponding to a plurality of device status records, respectively, the method including: receiving a first device status request from the master device; generating a first device status response, wherein based on a value of each status flag of the plurality of status flags, the first device status response comprises either a first response type having a first packet capacity or a second response type having a second packet capacity smaller than the first packet capacity; and transmitting the first device status response to the master device.

According to an aspect of the disclosure, an electronic device includes a memory cell and is configured to communicate with an external device through an in-band channel and an out-of-band channel, the electronic device further including: a plurality of status sensors configured to generate a plurality of status values; a status manager storing a plurality of device status records respectively including the plurality of status values; and a device controller configured to perform a read operation or a write operation on the memory cell in response to a command received through the in-band channel, wherein the status manager is configured to execute one or more instructions which cause the electronic device to: based on receiving a first device status request from the external device through the out-of-band channel, output to the external device through the out-of-band channel a first device status response representing that each of the plurality of device status records is normal, and based on receiving a second device status request from the external device through the out-of-band channel, output to the external device through the out-of-band channel a second device status response which includes one or more of the plurality of device status records and which has a packet capacity larger than the first device status response.

According to an aspect of the disclosure, a method of operating an electronic device configured to communicate with an external device and storing a plurality of device status records includes: receiving, from the external device, a first device status request comprising a first operation code; transmitting, in response to the first device status request, a first device status response having a first packet capacity, wherein the first device status response represents that the plurality of device status records are normal; receiving, from the external device, a second device status request comprising the first operation code; and transmitting, in response to the second device status request, a second device status response having a second packet capacity larger than the first packet capacity, wherein the second device status response comprises one or more of the plurality of device status records.

BRIEF DESCRIPTION OF DRAWINGS

The above and other aspects, features, and advantages of certain embodiments of the present disclosure will be more apparent from the following description taken in conjunction with the accompanying drawings, in which:

FIG. 2 is a diagram illustrating a device status log of FIG. 1;

FIG. 3 is a diagram illustrating a method of updating a device status log of FIG. 2;

DETAILED DESCRIPTION

Figure 1:
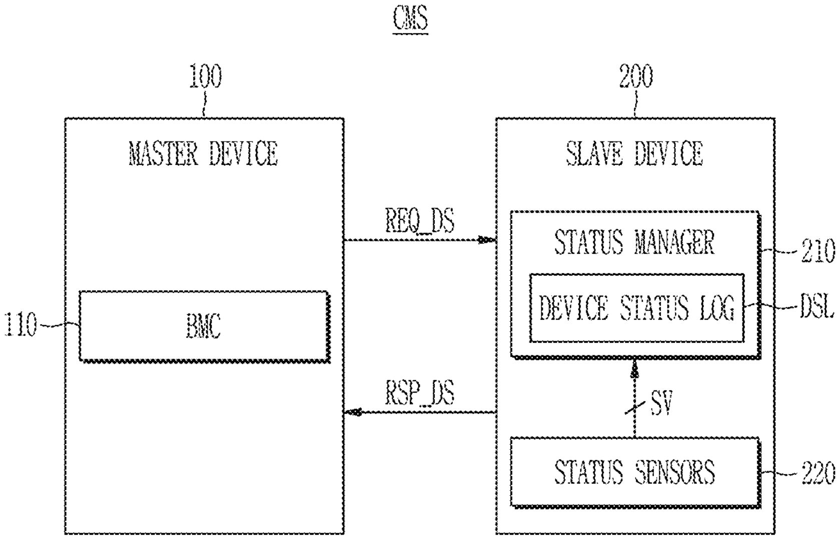
FIG. 1 is a block diagram illustrating a communication system according to an embodiment of the present disclosure.

Hereinafter, embodiments of the present disclosure will be described clearly and in detail to the extent that those skilled in the art can practice the present disclosure. Details such as detailed configurations and structures are provided merely to facilitate a general understanding of embodiments of the present disclosure. Therefore, modifications of embodiments described herein may be made by those skilled in the art without departing from the spirit and scope of the present disclosure. Moreover, descriptions of well-known functions and structures are omitted for clarity and simplicity. Components in the following drawings or detailed description may be connected with other components other than those shown in the drawings or described in the detailed description. The terms used in the text are terms defined in consideration of the functions of the present disclosure, and are not limited to specific functions. Definitions of terms may be determined based on the details described in the detailed description.

In the following description, like reference numerals refer to like elements throughout the specification. Terms such as "unit", "module", "member", "manager" and "block" may be embodied as hardware or software. As used herein, a plurality of "units", "modules", "members", "managers" and "blocks" may be implemented as a single component, or a single "unit", "module", "member", "manager" and "block" may include a plurality of components.

It will be understood that when an element is referred to as being "connected" with or to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

Herein, the expressions "at least one of a, b or c" and "at least one of a, b and c" indicate "only a," "only b," "only c," "both a and b," "both a and c," "both b and c," and "all of a, b, and c."

It will be understood that, although the terms first, second, third, etc., may be used herein to describe various elements, is the disclosure should not be limited by these terms. These terms are only used to distinguish one element from another element.

As used herein, the singular forms "a," "an" and "the" are intended to include the plural forms as well, unless the context clearly indicates otherwise.

With regard to any method or process described herein, an identification code may be used for the convenience of the description but is not intended to illustrate the order of each step or operation. Each step or operation may be implemented in an order different from the illustrated order unless the context clearly indicates otherwise. One or more steps or operations may be omitted unless the context of the disclosure clearly indicates otherwise.

Components described with reference to terms such as a driver or a block used in the detailed description may be implemented in the form of software, hardware, or a combination thereof. Illustratively, the software may be machine code, firmware, embedded code, and application software. For example, the hardware may include an electrical circuit, an electronic circuit, a processor, a computer, IC cores, a pressure sensor, an inertial sensor, a micro electro mechanical system (MEMS), passive devices, or combinations thereof.

FIG. 1 is a block diagram illustrating a communication system according to an embodiment of the present disclosure. Referring to FIG. 1, a communication system CMS may include a master device 100 and a slave device 200. The master device 100 and the slave device 200 may communicate with each other.

The master device 100 may include a baseboard management circuit (BMC) 110. The slave device 200 may include a status manager 210 and a plurality of status sensors 220.

The status manager 210 may store a device status log DSL. The device status log DSL may include a plurality of device status records about the slave device 200.

Each of the plurality of status sensors 220 may measure any type of status value SV for the slave device 200. For example, among the plurality of status sensors 220, a first status sensor may be a temperature sensor, and a second status sensor may be a power sensor. In this case, the first status sensor may measure a first status value corresponding to the temperature of the slave device 200, and the second status sensor may measure a second status value corresponding to power consumption of the slave device 200. However, the scope of the present disclosure is not limited to the type of status value measured by each of the plurality of status sensors 220.

The status manager 210 may receive status values SV from each of the plurality of status sensors 220. The status manager 210 may update a plurality of device status records included in the device status log DSL based on the plurality of received status values (SVs).

In an embodiment, the status manager 210 may store a plurality of status flags respectively corresponding to the plurality of device status records. Each of the plurality of status flags may represent whether the corresponding device status records represents a normal state.

In an embodiment, the plurality of status sensors 220 may be implemented as hardware independent each other. For example, each of the plurality of status sensors 220 may be implemented to measure the status value based on the control of the status manager 210 without an intervention of firmware run on a device controller of the slave device 200. However, the scope of the present disclosure is not limited thereto. For example, some of the plurality of status sensors 220 may be implemented to measure the status value based on the firmware running in the device controller of the slave device 200.

In an embodiment, each of the plurality of device status records included in the device status log DSL may be updated based on different status sensors 220. For example, the status values of the plurality of device status records included in the device status log DSL may be measured based on the status sensors 220 implemented as independent hardware. However, the scope of the present disclosure is not limited thereto.

A baseboard management circuit 110 may request the device status records for the slave device 200. For example, the baseboard management circuit 110 may transmit a device status request REQ_DS to the slave device 200.

The status manager 210 may transmit a device status response RSP_DS to the master device 100 in response to the device status request REQ_DS. In this case, the device status response RSP_DS may be any type of response packet generated based on the plurality of device status records stored in the device status log DSL.

In an embodiment, the device status response RSP_DS may include one or more device status records stored in the device status log DSL. For example, the device status response RSP_DS may include all the device status records stored in the device status log DSL, or may include device status records indicating an abnormal state among the device status records stored in the device status log DSL. However, the scope of the present disclosure is not limited thereto.

In an embodiment, the device status response RSP_DS may represent that the plurality of device status records stored in the device status log DSL is normal. For example, the device status response RSP_DS may represent that all the device status records are normal, instead of including all of the device status records (i.e., not including the device status records).

In an embodiment, a packet capacity of the device status response RSP_DS that does not include the device status records may be smaller than packet capacity of the device status response RSP_DS that includes one or more device status records.

The baseboard management circuit 110 may manage the device status records for the slave device 200. That is, the baseboard management circuit 110 may receive the device status records for the slave device 200 through the device status response RSP_DS, and control the operation of the slave device 200 based on the received device status records. For example, when the device status response RSP_DS represents that the temperature of the slave device 200 is high, the baseboard management circuit 110 may control the master device 100 to throttle the performance of the slave device 200. However, the scope of the present disclosure is not limited to the specific manner in which the baseboard management circuit 110 controls the operation of the communication system (CMS).

In an embodiment, the master device 100 may be implemented to control the slave device 200 in response to a request from an external user device accessing the communication system CMS through a network channel. In this case, the master device 100 may be a server device, and the communication system CMS may be a server system. The configuration and operation of the server system are described in more detail with reference to FIG. 17 below.

In an embodiment, the slave device 200 may be any type of electronic device that operates based on the control of the master device 100. For example, the slave device 200 may be any type of electronic device, which is controlled by the master device 100, such as a solid state drive (SSD), a dynamic random access memory (DRAM), a graphic processing unit (GPU), and a neural processing unit (NPU). However, for a more concise description, hereinafter, an embodiment in which the slave device 200 is the solid state drive (SSD) will be representatively described.

FIG. 2 is a diagram exemplarily illustrating the device status log of FIG. 1. Referring to FIGS. 1 and 2, the device status log DSL may include first to n-th device status records DSR1 to DSRn, first to n-th reference ranges RR1 to RRn, and first to n-th status flags SF1 to SFn.

Each of the first to n-th the device status records DSR1 to DSRn may represent a different type of status for the slave device 200. For example, each of the first to n-th the device status records DSR1 to DSRn may be telemetry information to predict lifespan of the slave device 200 or defect occurrence of the slave device 200. For a more detailed example, each of the first to n-th the device status records DSR1 to DSRn may be hardware telemetry information representing a hardware status of the slave device 200, or may be firmware telemetry information representing a status of firmware run by the slave device 200. However, the scope of the present disclosure is not limited thereto, and when the slave device 200 is the solid state drive (SSD), each of the first to n-th device status records DSR1 to DSRn may be NAND telemetry information representing a status of a volatile memory device (e.g., a NAND chip) included in the slave device 200, or self-monitoring, analysis, and reporting technology (SMART) telemetry information for a SMART operation. That is, the scope of the present disclosure will not be limited to a specific type of information represented by each of the first to n-th device status records DSR1 to DSRn.

In an embodiment, when the first to n-th device status records DSR1 to DSRn are hardware telemetry information, the first to n-th device status records DSR1 to DSRn may represent the temperature, power consumption, auxiliary power capacitor voltage, etc., of the slave device 200.

In an embodiment, when the first to n-th device status records DSR1 to DSRn are firmware telemetry information, the first to n-th device status records DSR1 to DSRn may represent the firmware information such as a firmware version of the slave device 200.

In an embodiment, when the first to n-th device status records DSR1 to DSRn are NAND telemetry information, the first to n-th device status records DSR1 to DSRn may represent information such as program/erase count (P/E count), an erase verification voltage, and a read voltage for each memory block of nonvolatile memory device included in the slave device 200.

In an embodiment, when the first to n-th device status records DSR1 to DSRn are SMART telemetry information, the first to n-th device status records DSR1 to DSRn may represent power-on-hours, power cycle count, sudden power off (SPO) count, etc., of the slave device 200.

Hereinafter, for a more concise description, an embodiment in which each of the first to n-th device status records DSR1 to DSRn are hardware telemetry information will be representatively described. For example, the first device status record DSR1 may represent the temperature of the slave device 200, and the second device status record DSR2 may represent the power consumption of the slave device 200. Similarly, the n-th device status record DSRn may represent the auxiliary power capacitor voltage of the slave device 200. However, the scope of the present disclosure is not limited to the number and type of device status records included in the device status log DSL.

Each of the first to n-th device status records DSR1 to DSRn may include a status record type, a timestamp, and a status value. For example, the first device status record DSR1 may include a time stamp value "0x00AA" and a status value "0x0011" for the "temperature" of the slave device 200, and the second device status record DSR2 may include a time stamp value "0x00BB" and a status value "0x0022" for the "power consumption" of the slave device 200. Similarly, the n-th device status record DSRn may include a time stamp value "0x00FF" and a status value "0x00nn" for an "auxiliary power capacitor voltage" of the slave device 200. For more concise description, detailed description of other device status records included in the device status log DSL is omitted.

The first to n-th reference ranges RR1 to RRn may correspond to the first to n-th device status records DSR1 to DSRn, respectively. The status manager 210 may determine whether the first to n-th device status records DSR1 to DSRn represent a normal state or an abnormal state, based on the first to n-th reference ranges RR1 to RRn. For example, the status manager 210 may determine whether the first to n-th device status records DSR1 to DSRn represent the normal state based on whether the status values of each of the first to n-th device status records DSR1 to DSRn are included in the corresponding reference range.

For a more detailed example, when the status value "0x0011" included in the first device status record DSR1 is included within the first reference range RR1, the status manager 210 may determine that the first device status record DSR1 represents the normal state. In other words, the status manager 210 may determine that the temperature of the slave device 200 is in the normal state.

Conversely, when the status value "0x0011" included in the first device status record DSR1 is not included within the first reference range RR1 (i.e., when it is out of the first reference range RR1), the status manager 210 may determine that the first device status record DSR1 represents an abnormal state. In other words, the status manager 210 may determine that the temperature of the slave device 200 is in the abnormal state. In a similar manner, the status manager 210 may determine whether each of the first to n-th device status records DSR1 to DSRn represents the normal state.

The first to n-th status flags SF1 to SFn may correspond to the first to n-th device status records DSR1 to DSRn, respectively. The status manager 210 may represent whether each of the first to n-th device status records DSR1 to DSRn is normal or abnormal based on the first to n-th status flags SF1 to SFn. That is, the status manager 210 may represent whether the first to n-th device status records DSR1 to DSRn represents the normal state by the first to n-th status flags SF1 to SFn, respectively. For example, when it is determined that the first device status record DSR1 is normal, the status manager 210 may set the first status flag SF1 to a first value (e.g., "0"). Conversely, when it is determined that the first device status record DSR1 is abnormal, the status manager 210 may set the first status flag SF1 to a second value (e.g., "1").

Hereinafter, for a more concise description, it is assumed that the first value is "0" and the second value is "1". However, the scope of the present disclosure is not limited thereto.

In an embodiment, each of the first to n-th status flags SF1 to SFn may have a 1-bit code length. In this case, the device status log DSL may store the first to n-th status flags SF1 to SFn with minimal capacity. However, the scope of the present disclosure is not limited thereto.

FIG. 3 is a diagram illustrating a method of updating a device status log of FIG. 2. Referring to FIGS. 1 to 3, the status manager 210 may update the device status log DSL based on the status value SV received from the plurality of status sensors 220. For example, the status manager 210 may receive a status value "0x0033" for the power consumption of the slave device 200 from the plurality of status sensors 220 at a time corresponding to timestamp "0x00CC". In this case, the status manager 210 may update a timestamp and status value for the second device status records DSR2.

The status manager 210 may determine whether the device status record, which includes the updated status value, is normal or abnormal. For example, the status manager 210 may determine whether "0x0033" is included in the second status range RR2. When "0x0033" is included in the second status range RR2, as illustrated in FIG. 3, the status manager 210 may change the second status flag SF2 to "1". However, the scope of the present disclosure is not limited thereto.

Figure 4:
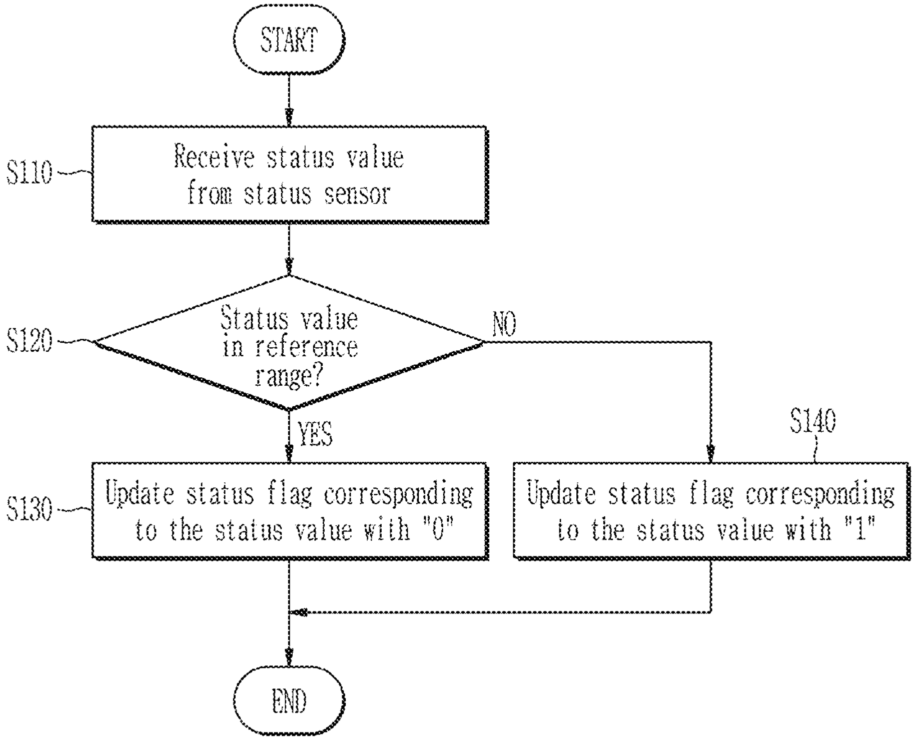
FIG. 4 is a flowchart illustrating a method of updating, by a status manager of FIG. 1, device status records.

FIG. 4 is a flowchart illustrating a method of updating, by a status manager of FIG. 1, device status records. Hereinafter, referring to FIGS. 1 to 4, a method of updating, by a status manager, one device status record DSR will be representatively described. However, the scope of the present disclosure is not limited thereto, and the status manager 210 may update each of the first to n-th device status records DSR1 to DSRn in a similar manner.

In operation S110, the status manager 210 may receive the status value SV from the status sensor 220. For example, the status manager 210 may receive the status value SV for the temperature of the slave device 200 from the status sensor 220.

In operation S120, the status manager 210 may determine whether the received status value SV is included in corresponding reference range. For example, when the status value corresponding to the first device status record DSR1 is received in operation S110, the status manager 210 may determine whether the received status value is included in the first reference range RR1.

In operation S120, when it is determined that the received status value is included in the corresponding reference range, the following operation S130 may be performed. In operation S120, when it is determined that the received status value is not included in the corresponding reference range, the following operation S140 may be performed.

In operation S130, the status manager 210 may update the status flag corresponding to the status value to "0". For example, when the status value for the first device status record DSR1 is received in operation S110, the status manager 210 may update the first status flag SF1 to "0".

In operation S140, the status manager 210 may update the status flag corresponding to the status value to "1". For example, when the status value for the first device status record DSR1 is received in operation S110, the status manager 210 may update the first status flag SF1 to "1".

In this way, the status manager 210 may sequentially update the plurality of device status records and the plurality of status flags based on the status value received from each of the plurality of status sensors 220. However, the scope of the present disclosure is not limited to the specific manner in which the status manager 210 updates the device status log DSL.

Figure 5:
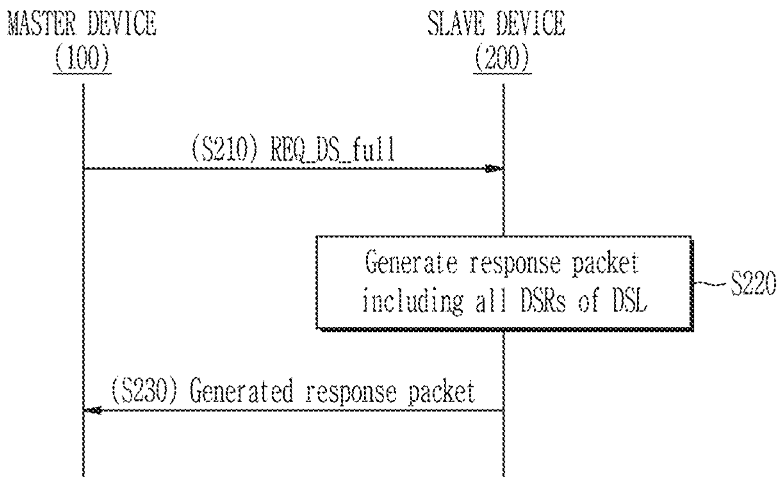
FIG. 5 is a flowchart illustrating an operation of a communication system of FIG. 1 according to an embodiment.

FIG. 5 is a flowchart illustrating the operation of the communication system of FIG. 1 according to an embodiment. Referring to FIGS. 1 to 5, in operation S210, the master device 100 may transmit a full-device status request REQ_DS_full to the slave device 200. For example, the master device 100 may request all of device status records DSR included in the device status log DSL through the full-device status request REQ_DS_full.

In operation S220, the slave device 200 may generate a response packet including all device status records included in the device status log DSL. For example, the status manager 210 may generate the response packet including the first to n-th device status records DSR1 to DSRn included in the device status log DSL in response to the full-device status request REQ_DS_full.

In operation S230, the slave device 200 may transmit the generated response packet to the master device 100. In this case, the response packet transmitted to the master device 100 may correspond to the device status response RSP_DS described above with reference to FIG. 1. In other words, the device status response RSP_DS transmitted to the master device 100 in operation S230 may include all of the device status records included in the device status log DSL.

Hereinafter, for a more concise description, the device status response RSP_DS including all the device status records included in the device status log DSL will be referred to as having a first response type (hereinafter, referred to as "RSPT1").

Figure 6:
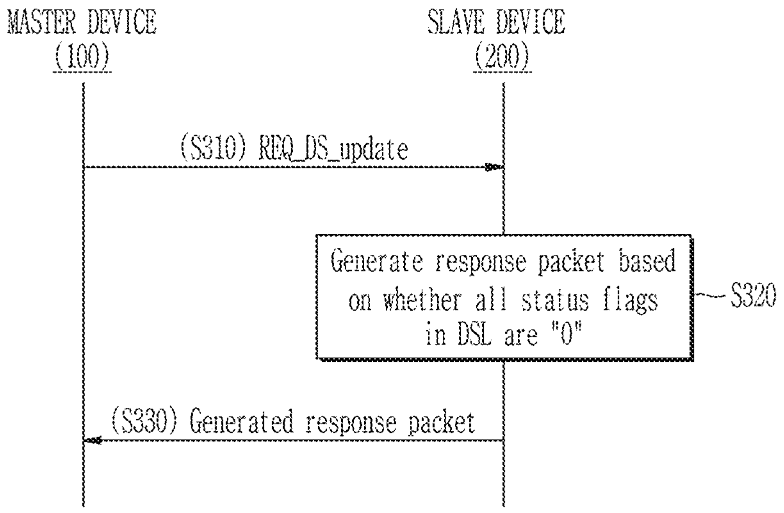
FIG. 6 is a flowchart illustrating the operation of the communication system of FIG. 1 according to an embodiment.

FIG. 6 is a flowchart illustrating the operation of the communication system of FIG. 1 according to an embodiment. Referring to FIGS. 1 to 6, in operation S310, the master device 100 may transmit an update-device status request REQ_DS_update to the slave device 200. For example, the master device 100 may request whether the device status record DSR included in the device status log DSL has been updated, through the update-device status request REQ_DS_update.

In operation S320, the slave device 200 may generate the response packet based on whether all of the status flags included in the device status log DSL are "0". That is, the status manager 210 may generate the response packet based on whether all of the device status records included in the device status log DSL are normal, in response to the update-device status request REQ_DS_update. The method of generating, by the status manager 210, the response packet in response to the update-device status request REQ_DS_update is described in more detail with reference to FIGS. 7 and 11 below.

In an embodiment, when all the status flags included in the device status log DSL are "0", the status manager 210 may generate the response packet that does not include the device status record DSR in response to the update-device status request REQ_DS_update.

In an embodiment, when a status flag of "1" exists among the status flags included in the device status log DSL, the status manager 210 may generate the response packet including one or more device status record DSR in response to the update-device status request REQ_DS_update.

In an embodiment, the capacity of the response packet that does not include the device status record DSR may be smaller than capacity of the response packet that includes the device status record DSR. That is, according to an embodiment of the present disclosure, response packets of different sizes may be generated based on whether all the status flags included in the device status log DSL are "0".

In operation S330, the slave device 200 may transmit the generated response packet to the master device 100. In this case, the response packet transmitted to the master device 100 may correspond to the device status response RSP_DS previously described with reference to FIG. 1. That is, the master device 100 may receive the device status response RSP_DS having different capacities depending on whether the device status record DSR representing the abnormal state is included in the device status log DSL.

Figure 7:
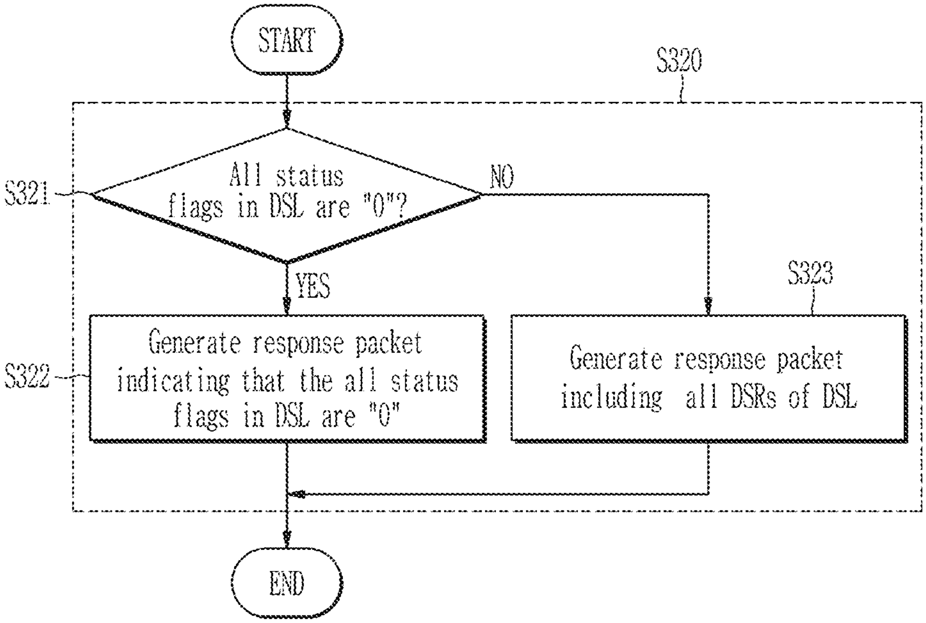
FIG. 7 is a flowchart illustrating in more detail operation S320 of FIG. 6 according to an embodiment.

FIG. 7 is a flowchart illustrating in more detailed operation S320 of FIG. 6 according to an embodiment. Referring to FIGS. 1 to 7, operation S320 may include the following operations S321 to S323.

In operation S321, the status manager 210 may determine whether all the status flags of the device status log DSL are "0". For example, the status manager 210 may determine whether all the first to n-th status flags SF1 to SFn are "O".

When it is determined in operation S321 that all the status flags in the device status log DSL are "0", the following operation S322 may be performed. When it is determined in operation S321 that one or more status flags are not "0" (i.e., when it is determined that one or more status flags are "1"), the following operation S323 may be performed.

In operation S322, the status manager 210 may generate the response packet indicating that all of the status flags of the device status log DSL are "0". For example, the status manager 210 may generate the response packet representing that all of the device status records included in the device status log DSL are normal, without including any of the device status records DSR. In this case, in operation S330, the device status response RSP_DS transmitted to the master device 100 does not include the device status records DSR, and may represent that all of the device status records included in the device status log DSL are normal.

Hereinafter, for more concise description, the device status response RSP_DS that does not include the device status records DSR will be referred to as having a second response type (hereinafter referred to as "RSPT2").

In operation S323, the status manager 210 may generate the response packet including all of the device status records DSR included in the device status log DSL. For example, the status manager 210 may generate the response packet including all of the first to n-th device status records DSR1 to DSRn. In this case, in operation S330, the device status response RSP_DS transmitted to the master device 100 may have the first response type RSPT1 described above with reference to FIG. 5.

In an embodiment, the capacity of the response packet for the device status response RSP_DS having the second response type RSPT2 may be smaller than capacity of the response packet for the device status response RSP_DS having the first response type RSPT1.

For a more concise description, in FIG. 7, an embodiment in which, when one or more of the status flags of the device status log DSL are not "0", the status manager 210 generates the response packet including all of the device status records DSR included in the device status log DSL as representatively described. However, the scope of the present disclosure is not limited thereto, and when one or more of the status flags of the device status log DSL is not "0", the status manager 210 may be implemented to generate the response packet including only the device status records corresponding to status flag "1" (i.e., the device status records that are abnormal). The operation of the status manager 210, which generates the response packet including only the device status records that are abnormal, will be described in more detail with reference to FIG. 11 below.

Figure 8:
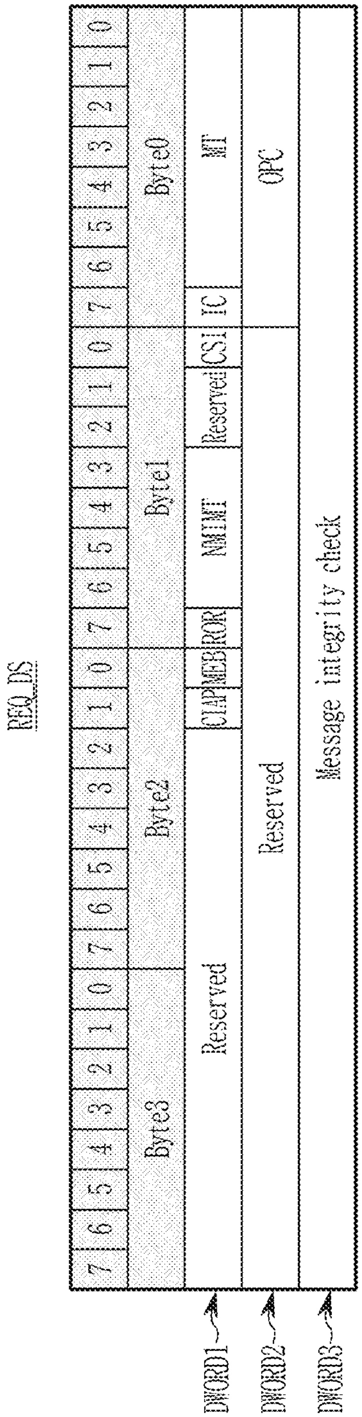
FIG. 8 is a diagram illustrating a packet structure of a device status request of FIG. 1.

FIG. 8 is a diagram exemplarily illustrating a packet structure of a device status request of FIG. 1. Hereinafter, for a more concise description, it is assumed that the slave device 200 is the solid state drive (SSD) and that the device status request REQ_DS has an NVMe-MI message format. However, the scope of the present disclosure is not limited thereto, and the slave device 200 may be any type of electronic device controlled by the master device 100, and the device status request REQ_DS may have any type of communication format.

Referring to FIGS. 1 to 8, the device status request REQ_DS may include first to third DWORDs (DWORD1 to DWORD3). However, the scope of the present disclosure is not limited to the number of DWORDs included in the device status request REQ_DS.

The first DWORD (DWORD1) of the device status request REQ_DS may be an NVMe-MI message header. For example, the first DWORD (DWORD1) may include a message type (MT), an integrity check bit (IC), a command slot identifier bit (CSI), and an NVMe-MI message type (NMIMT), a request or response bit (ROR), a management endpoint buffer bit (MEB), and command initiated auto pause bit (CIAP). In this case, the message type (MT) and the integrity check bit (IC) may be defined based on the MCTP protocol. However, the scope of the present disclosure is not limited thereto.

The second DWORD (DWORD2) of the device status request REQ_DS may include an operation code (OPC). The operation code (OPC) may represent the type of device status request REQ_DS. For example, the operation code (OPC) may represent whether the device status request REQ_DS is the full-device status request REQ_DS_full or the update-device status request REQ_DS_update. In other words, the master device 100 may indicate requesting information to the slave device 200 through the device status request REQ_DS based on different operation codes (OPC). However, the scope of the present disclosure is not limited thereto.

In an embodiment, the operation code (OPC) when the device status request REQ_DS is the full-device status request REQ_DS_full may be different from the operation code (OPC) when the device status request REQ_DS is the update-device status request REQ_DS_update. For example, the operation code (OPC) when the device status request REQ_DS is the full-device status request REQ_DS_full may be a first operation code, and the operation code (OPC) when the device status request REQ_DS is the update-device status request REQ_DS_update may be a second operation code.

In an embodiment, a code length of the operation code (OPC) may be 8 bits. However, the scope of the present disclosure is not limited to the code length of the operation code (OPC).

The third DWORD (DWORD3) of the device status request REQ_DS may include a message integrity check code. For example, the third DWORD (DWORD3) may include a cyclic redundancy check code (CRC) code used when the integrity check bit (IC) is "1". However, the scope of the present disclosure is not limited thereto.

Figure 9:
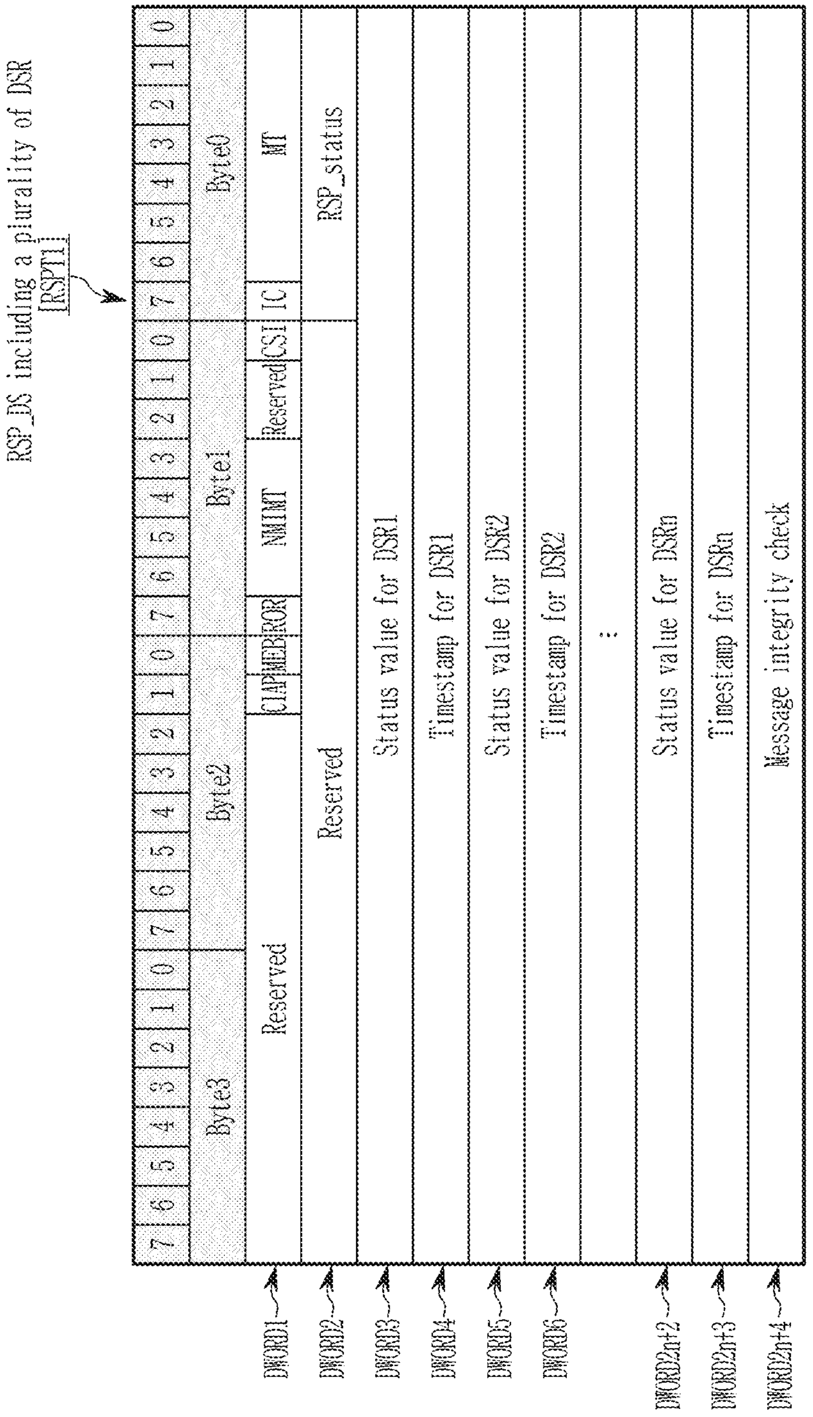
FIGS. 9 and 10 are diagrams illustrating a packet structure of a device status response of FIG. 1.
Figure 10:
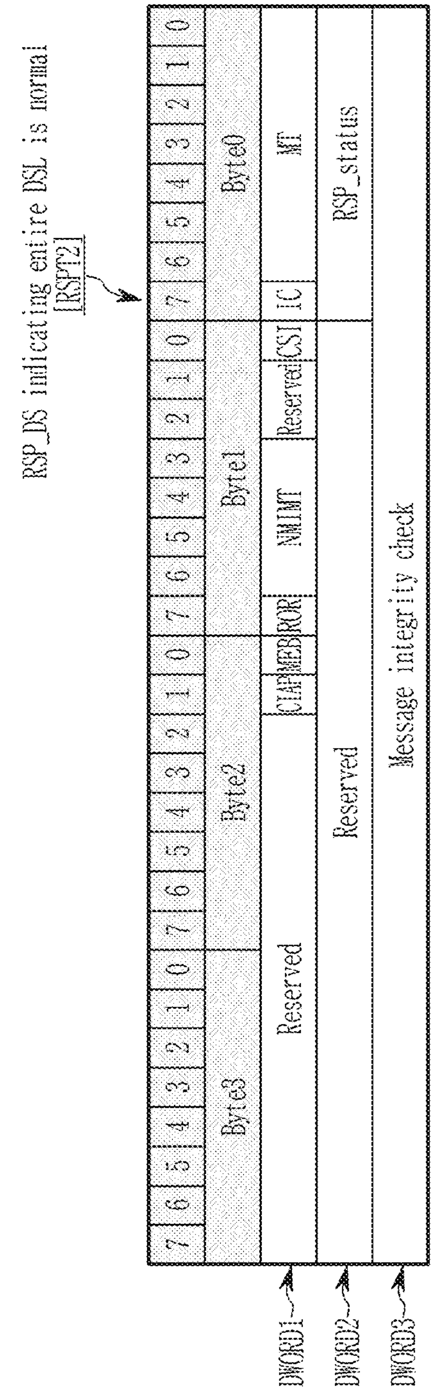

FIGS. 9 and 10 are diagrams illustrating an example packet structure of a device status response of FIG. 1. Hereinafter, referring to FIGS. 1 to 10, different response types of device status responses RSP_DS generated by the status manager 210 will be described. For example, a packet structure of the device status response RSP_DS having the first response type RSPT1 is described below with reference to FIG. 9, and the packet structure of the device status response RSP_DS having the second response type RSPT2 will be described with reference to FIG. 10.

In addition, hereinafter, for a more concise description, the device status response RSP_DS is assumed to have the NVMe-MI message format (more specifically, the NVMe-MI message response) format. However, the scope of the present disclosure is not limited thereto, and the device status response RSP_DS may have any type of communication format.

First, referring to FIGS. 9 and 10 together, the device status response RSP_DS having the first response type RSPT1 may include first to (2*n*+4)th DWORDs (DWORD1 to DWORD2*n*+4). The device status response RSP_DS having the second response type RSPT2 may include the first to third DWORDs (DWORD1 to DWORD3). However, the scope of the present disclosure is not limited to the number of DWORDs included in the device status request REQ_DS.

The first DWORD (DWORD1) of the device status request REQ_DS may be the NVMe-MI message header. The first DWORD (DWORD1) of the device status response RSP_DS is similar to the first DWORD (DWORD1) of the device status request REQ_DS described above with reference to FIG. 8, and therefore, detailed description thereof will be omitted.

The second DWORD (DWORD2) of the device status response RSP_DS may include a response status code RSP_status. The response status code RSP_status may represent the response type of the device status response RSP_DS. For example, the response status code RSP_status may represent whether the device status response RSP_DS is the first response type RSPT1 or the second response type RSPT2. That is, the response status code RSP_status may represent whether the device status response RSP_DS includes the device status records DSR. In this case, the master device 100 may be able to identify the response type of the device status response RSP_DS based on the response status code RSP_status.

In an embodiment, in response to the master device 100 transmitting the update-device status request REQ_DS_update, when the device status response RSP_DS having the first response type RSPT1 is returned from the slave device 200, the master device 100 may be able to recognize that the device status log DSL includes one or more abnormal device status records DSR. Conversely, in response to the master device 100 transmitting the update-device status request REQ_DS_update, when the device status response RSP_DS having the second response type RSPT2 is returned from the slave device 200, the master device 100 may be able to recognize that all the device status records DSR included in the device status log DSL are normal.

In an embodiment, the response status code RSP_status may be defined in a vendor-specific manner. For example, the first response type RSPT1 and the second response type RSPT2 may be represented by different code value among "EOh" to "FFh". However, the scope of the present disclosure is not limited thereto.

The last DWORD of the device status response RSP_DS may include the message integrity check code. For example, the (2n+4)th DWORD (DWORD2*n*+4) of the device status response RSP_DS having the first response type RSPT1 and the third DWORD (DWORD3) of the device status response RSP_DS having the second response type RSPT2 may include the message integrity check code. The configuration and function of the message integrity check code are similar to those described above with reference to FIG. 8, and therefore, detailed description thereof will be omitted.

Continuing to refer to FIG. 9, the third to 2n+3 DWORDs (DWORD3 to DWORD2*n*+3) of the device status response RSP_DS having the first response type RSPT1 may represent the plurality of device status records DSR. For example, the third to fourth DWORDs DWORD3 to DWORD4 may each represent the status value and the time stamp of the first device status record DSR1, and fifth to sixth DWORDs DWORD5 to DWORD6 may each represent the status value and the time stamp of the second device status record DSR2. Similarly, 2n+2 to 2n+3 DWORDs DWORD2*n*+2 to DWORD2*n*+3 may each represent the status value and time stamp of the n-th device status record DSRn.

For a more concise description, an embodiment in which the status value and the time stamp of a given device status record DSR each correspond to one DWORD has been representatively described in FIG. 9, but the scope of the present disclosure is not limited thereto. For example, the device status response RSP_DS may represent the status value and the time stamp of a device status records DSR with an arbitrary number of bits such as 8-bit, 16-bit, and 64-bit.

In an embodiment, the order of the third to 2n+3 DWORDs (DWORD3 to DWORD2n+3) may be predetermined. For example, the first to n-th device status records DSR1 to DSRn may be transmitted to the master device 100 based on the predetermined order of DWORDs. In this case, the master device 100 may parse the first to n-th device status records DSR1 to DSRn from the device status response RSP_DS having the first response type RSPT1 according to the predetermined order.

On the other hand, referring to FIG. 10, the device status response RSP_DS having the second response type RSPT2 may not include the device status records DSR. For example, the device status records may not be included between the response status code RSP_status and the message integrity check code of the device status response RSP_DS having the second response type RSPT2. In this case, the device status response RSP_DS having the second response type RSPT2 may have a smaller capacity than the device status response RSP_DS having the first response type RSPT1.

The device status response RSP_DS having the second response type RSPT2 may represent that all the device status records DSR in the device status log DSL are in a normal state. For example, when the device status log DSL includes the device status records DSR representing the abnormal state, the slave device 200 may transmit the device status response RSP_DS having the first response type RSPT1 to the master device 100 in response to the update-device status request REQ_DS_update. On the other hand, when the device status log DSL does not include the device status records DSR representing the abnormal state, the slave device 200 may transmit the device status response RSP_DS having the second response type RSPT2 to the master device 100. Therefore, the master device 100 may determine that the device status response RSP_DS has the second response type RSPT2 based on the response status code RSP_status, and determine that all the device status records DSR in the device status log DSL are in the normal state.

Therefore, according to an embodiment of the present disclosure, when all the device status records DSR included in the device status log DSL are normal, the capacity of the response packet transmitted from the slave device 200 to the master device 100 may be minimized.

In an embodiment, when the capacity of the response packet transmitted from the slave device 200 to the master device 100 is minimized, a communication channel formed between the slave device 200 and the master device 100 may be implemented in a smaller bandwidth. In this case, a frequency of occurrence of communication errors and power consumption of the communication system CMS may be minimized. However, the scope of the present disclosure is not limited thereto.

In an embodiment, when the capacity of the response packet transmitted from the slave device 200 to the master device 100 is minimized, the master device 100 may receive the device status records of the slave device 200 with higher frequency. In this case, the master device 100 will be able to more appropriately control the operation of the slave device 200 based on the device status records of the slave device 200. However, the scope of the present disclosure is not limited thereto.

Figure 11:
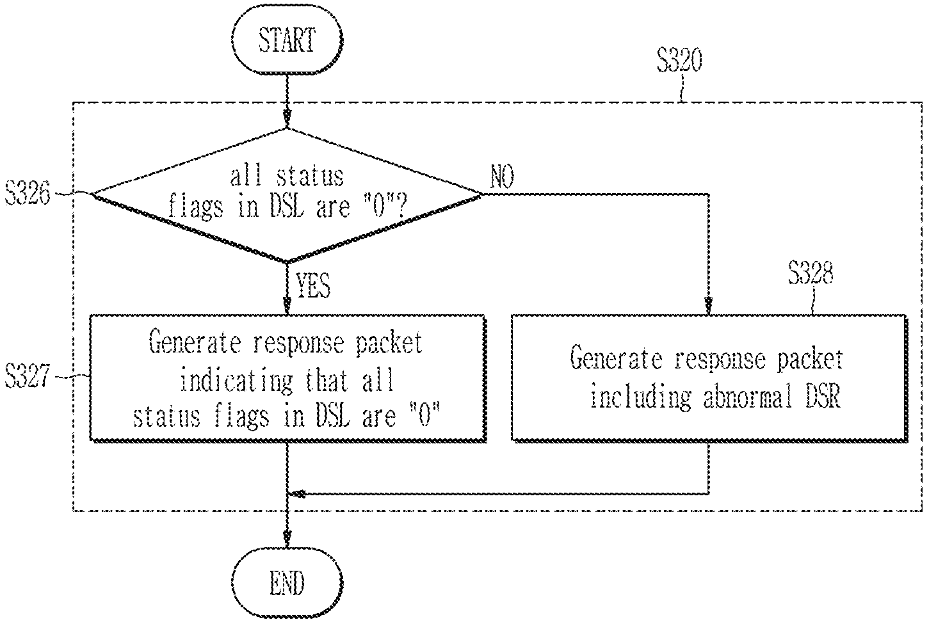
FIG. 11 is a flowchart illustrating in more detail operation S320 of FIG. 6 implemented according to an embodiment.

FIG. 11 is a flowchart illustrating in more detail operation S320 of FIG. 6 implemented according to an embodiment. Referring to FIGS. 1 to 6 and FIG. 11, operation S320 may include the following operations S326 to S328.

In operation S326, the status manager 210 may determine whether all the status flags of the device status log DSL are "0". Operation S326 is similar to operation S321 described above with reference to FIG. 7, and therefore, detailed description thereof will be omitted.

When it is determined in operation S326 that all the status flags in the device status log DSL are "0", the following operation S327 may be performed. When it is determined in operation S326 that one or more status flags are not "0" (i.e., when it is determined that one or more status flags are "1"), the following operation S328 may be performed.

In operation S327, the status manager 210 may generate the response packet indicating that all the status flags of the device status log DSL are "0". In this case, the device status response RSP_DS transmitted to the master device 100 in operation S330 may have the second response type RSPT2. Operation S327 is similar to operation S322 described above with reference to FIG. 7, and therefore, detailed description thereof will be omitted.

In operation S328, the status manager 210 may generate a response packet including the abnormal device status records DSR. For example, the status manager 210 may generate the response packet including the device status records corresponding to a status flag having a value of "1". For a more detailed example, when the second status flag SF2 is "1", the status manager 210 may generate the response packet including the second device status record DSR2. In this case, the device status response RSP_DS transmitted to the master device 100 in operation S330 may include one abnormal device status record DSR.

In an embodiment, the response packet generated in operation S328 may not include the device status records representing the normal state. For example, when the second status flag SF2 is "1", and the first status flag SF1 and the third to n-th status flags SF3 to SFn are "0", the response packet generated in operation S328 may not include the first device status record DSR1 and the third to n-th device status records DSR3 to DSRn.

Hereinafter, for a more concise description, the device status response RSP_DS including one abnormal device status record DSR is referred to as having the third response type (hereinafter referred to as "RSPT3").

In an embodiment, the capacity of the response packet for the device status response RSP_DS having the second response type RSPT2 may be smaller than capacity of the response packet for the device status response RSP_DS having a third response type RSPT3; and the capacity of the response packet for the device status response RSP_DS having the third response type RSPT3 may be smaller than capacity of the response packet for the device status response RSP_DS having the first response type RSPT1.

For a more concise description, an embodiment of a case in which one device status record DSR is abnormal has been representatively described in FIG. 11, but the scope of the present disclosure is not limited thereto. For example, when a plurality of device status records included in the device status log DSL are abnormal, in operation S328, the status manager 210 may generate the response packet including the plurality of abnormal device status records, or generate the response packet including an arbitrary one of the plurality of abnormal device status records. However, below, an embodiment in which the response packet generated in operation S328 includes one device status record will be representatively described.

Figure 12:
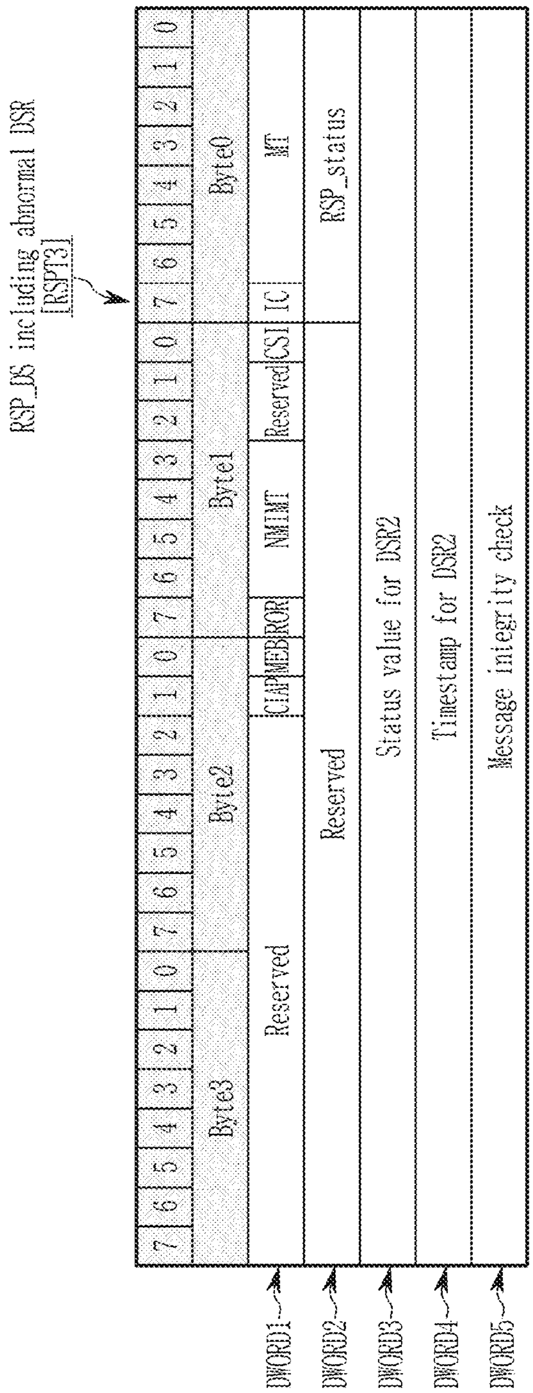
FIG. 12 is a diagram illustrating a packet structure of a device status response of FIG. 1.

FIG. 12 is a diagram illustrating an example packet structure of the device status request of FIG. 1. Referring to FIGS. 1 to 7 and 11 to 12, the status manager 210 may generate the device status response RSP_DS having the third response type RSPT3. The device status response RSP_DS having the third response type RSPT3 may include one device status record DSR.

The device status response RSP_DS having the third response type RSPT3 may include the first to fifth DWORDs (DWORD1 to DWORD5). However, the scope of the present disclosure is not limited to the number of DWORDs included in the device status request REQ_DS.

The first DWORD (DWORD1) of the device status response RSP_DS having the third response type RSPT3 may be the NVMe-MI message header. The first DWORD (DWORD1) of the device status response RSP_DS having the third response type RSPT3 is similar to that described above with reference to FIGS. 9 and 10, and therefore, detailed description thereof will be omitted.

The second DWORD (DWORD2) of the device status response RSP_DS having the third response type RSPT3 may include the response status code RSP_status. The response status code RSP_status may represent the response type of the device status response RSP_DS. For example, the response status code RSP_status may represent whether the device status response RSP_DS has any response type among the first response type RSPT1 to the third response type RSPT3.

In addition, the response status code RSP_status may represent the type of the device status record included in the device status response RSP_DS. For example, the response status code RSP_status may represent that the device status record, which is included in the device status response RSP_DS having the third response type RSPT3, corresponds to the "power consumption".

In an embodiment, the response status code RSP_status may be defined in a vendor-specific manner. For example, the response status code RSP_status representing that the device status response RSP_DS is the third response type RSPT3 corresponds to two or more (e.g., n) code values among "EOh" to "FFh". For example, two or more code values among "EOh" to "FFh" may represent that the device status response RSP_DS is the third response type RSPT3 and may represent different types of the device status records DSR respectively. However, the scope of the present disclosure is not limited thereto.

The third to fourth DWORDs (WORD3 to DWORD4) of the device status response RSP_DS having the third response type RSPT3 may represent the abnormal device status record DSR. For example, when the second device status record DSR2 is abnormal (that is, when the status value included in the second device status record DSR2 is out of the second reference range RR2), the third to fourth DWORDs (DWORD3 and DWORD4) may represent the status value and the time stamp of the second device status record DSR2 respectively.

For a more concise description, an embodiment in which the status value and the time stamp of a device status record DSR each correspond to one DWORD has been representatively described in FIG. 12, but the scope of the present disclosure is not limited thereto. For example, the device status response RSP_DS may represent the status value and the time stamp of a device status record DSR with an arbitrary number of bits such as 8-bit, 16-bit, and 64-bit.

The fifth DWORD (DWORD5) of the device status response RSP_DS having the third response type RSPT3 may include the message integrity check code. The configuration and function of the message integrity check code are similar to those described above with reference to FIG. 8, and therefore, detailed description thereof will be omitted.

Therefore, according to an embodiment described with reference to FIGS. 11 and 12, the slave device 200 may transmit a response packet having a smaller capacity and transmit key information (e.g., whether all the device status records represents the normal state, and which of the device state information represents the abnormal state) to the master device 100. However, the scope of the present disclosure is not limited thereto.

Figure 13:
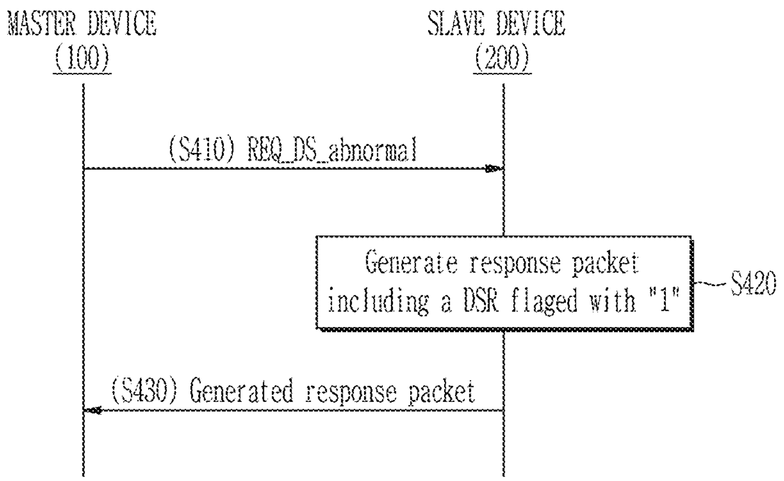
FIG. 13 is a flowchart illustrating the operation of the communication system of FIG. 1 according to an embodiment.

FIG. 13 is a flowchart illustrating the operation of the communication system of FIG. 1 according to an embodiment. Referring to FIGS. 1 to 4 and FIG. 13, in operation S410, the master device 100 may transmit an abnormal-device status request REQ_DS_abnormal to the slave device 200. For example, the master device 100 may request device status records representing the abnormal state among a plurality of device status records DSR included in the device status log DSL through the abnormal-device status request REQ_DS_abnormal.

In operation S420, the slave device 200 may generate the response packet including the device status records representing abnormal. For example, the status manager 210 may generate a response packet including device status records DSR corresponding to the status flag "1" among the plurality of device status records included in the device status log DSL in response the abnormal-device status request REQ_DS_abnormal.

In an embodiment, when the device status log DSL includes a plurality of abnormal device status records, the status manager 210 may generate a response packet including the plurality of abnormal device status records, or generate a response packet including any one of the plurality of abnormal device status records. However, the scope of the present disclosure is not limited thereto.

In operation S430, the slave device 200 may transmit the generated response packet to the master device 100. In this case, the response packet transmitted to the master device 100 may correspond to the device status response RSP_DS of the third response type RSPT3 described above with reference to FIG. 12.

That is, according to an embodiment of FIG. 13, the master device 100 may transmit the abnormal-device status request REQ_DS_abnormal to the slave device 200, and receive the device status records DSR representing the abnormal state among the plurality of device status records included in the device status log DSL. However, the scope of the present disclosure is not limited thereto.

Figure 14:
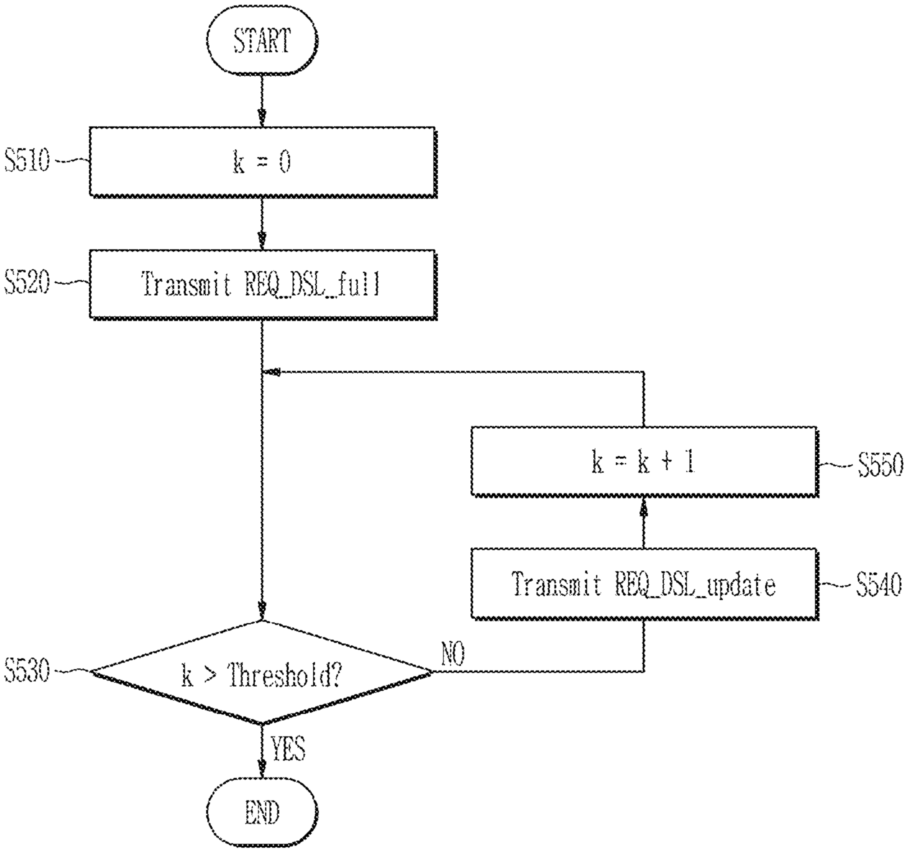
FIG. 14 is a flowchart illustrating a method of collecting, by a master device of FIG. 1, device status records from a slave device.

FIG. 14 is a flowchart illustrating a method of collecting, by the master device 100 of FIG. 1, the device status records from the slave device 200. Hereinafter, referring to FIGS. 1 to 14, an embodiment in which the master device 100 continuously requests the device status records from the slave device 200 will be described.

In operation S510, a variable "k" may be set to "0". The variable "k" is only used to describe a repetitive operation of the master device 100 and does not limit the scope of the present disclosure.

In operation S520, the master device 100 may transmit the full-device status request REQ_DS_full to the slave device 200. In this case, the slave device 200 may transmit the device status response RSP_DS having the first response type RSPT1 to the master device 100 in response to the full-device status request REQ_DS_full.

In operation S530, it may be determined whether the variable "k" is greater than a threshold value.

In operation S530, when it is determined that the variable "k" is smaller than the threshold value, the following operations S540 and S550 may be performed.

In operation S540, the master device 100 may transmit the update-device status request REQ_DS_update to the slave device 200. In this case, the slave device 200 may transmit the device status response RSP_DS having the first response type RSPT1 or the second response type RSPT2 to the master device 100 according to whether all the device status records DSR included in the device status log DSL are normal, in response to the update-device status request REQ_DS_update.

For a more concise description, an embodiment in which the slave device 200 transmits the device status response RSP_DS having the first response type RSPT1 or the second response type RSPT2 to the master device 100 in response to the update-device status request REQ_DS_update has been representatively described in operation S540, but the scope of the present disclosure is not limited thereto. For example, similar to what was described above with reference to FIGS. 11 and 12, the slave device 200 may be implemented to transmit the device status response RSP_DS having the first response type RSPT1 or the third response type RSPT3 to the master device 100 in response to the update-device status request REQ_DS_update.

In addition, for a more concise description, an embodiment in which the master device 100 transmits the update-device status request REQ_DS_update to the slave device 200 has been representatively described in operation S540, but the scope of the present disclosure is not limited thereto. For example, the master device 100 may be implemented to transmit the abnormal-device status request REQ_DS_abnormal described above with reference to FIG. 13.

In operation S550, the variable "k" may be increased by "1". Thereafter, operation S530 may be performed repeatedly.

When it is determined that "k" is greater than the threshold value in operation S530, the operation of the master device 100 may be terminated. However, the scope of the present disclosure is not limited thereto, and the master device 100 may repeatedly perform operations S510 to S550 described above.

That is, according to an embodiment of the present disclosure, the master device 100 may transmit the update-device status request REQ_DS_update to the slave device 200 at a high frequency, and transmit the full-device status request REQ_DS_full to the slave device 200 at a low frequency. That is, the master device 100 may receive all the device status records of the slave device 200 at a low frequency, and may receive a brief response for the device status records of the slave device 200 at a high frequency. In this case, when there is no device status record representing the abnormal state in the device status log DSL, the slave device 200 may return the device status response RSP_DS having a minimized capacity in response to the update-device status request REQ_DS_update. Therefore, according to an embodiment of the present disclosure, the master device 100 may receive the device status response RSP_DS from the slave device 200 more frequently.

In an embodiment, each of the device status records DSR included in the device status log DSL may include the status value measured based on a status sensor 220 implemented as independent hardware. In this case, the slave device 200 may be able to generate the device status response RSP_DS without accessing information stored in a non-volatile memory area, such as erase count and write count. In this case, since the information stored in the non-volatile memory area is not accessed at a high frequency, the number of times of accessing to the non-volatile memory area may be minimized, but the scope of the present disclosure is not limited thereto.

Figure 15:
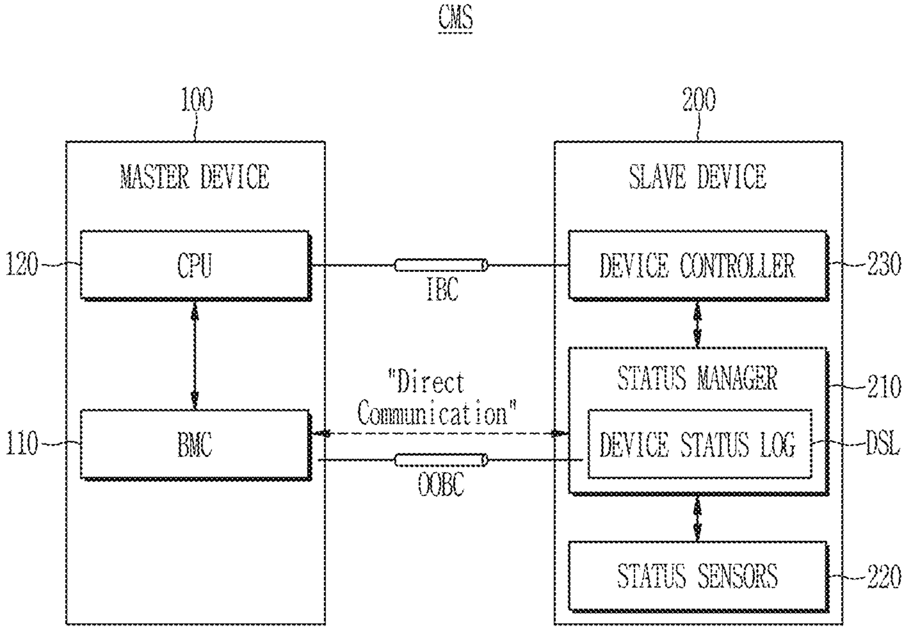
FIG. 15 is a block diagram illustrating in more detail the communication system of FIG. 1.

FIG. 15 is a block diagram illustrating in more detail the communication system of FIG. 1. Referring to FIGS. 1 to 15, the communication system may include a baseboard management circuit (BMC) 110 and a central processing unit (CPU) 120.

The central processing unit 120 may control the overall operation of the master device 100. For example, the central processing unit 120 may control components of the master device 100 to transmit commands or instructions to the slave device 200.

The slave device 200 may include the status manager 210, the plurality of device status sensors 220, and a device controller 230.

The device controller 230 may control the overall operation of the slave device 200. For example, the device controller 230 may control components of the slave device 200 in response to the commands or instructions provided from the master device 100. For a more detailed example, when the slave device 200 is a memory device, the device controller 230 may perform read operation or write operation on memory cells included in the slave device 200 in response to the commands or instructions provided from the master device 100. Similarly, when the slave device 200 is a graphic processing unit (GPU), the device controller 230 may control an arithmetic and logical unit (ALU) included in the slave device 200 in response to the commands or instructions provided from the master device 100. However, the scope of the present disclosure is not limited thereto, the slave device 200 may be any type of electronic device controlled by the master device 100, such as a neural processing unit (NPU), and the device controller 230 may be any control logic circuit configured to control the main functions of the slave device 200.

The master device 100 and the slave device 200 may communicate each other through an in-band channel IBC and an out-of-band channel OOBC.

The master device 100 may control the main operations of the slave device 200 through the in-band channel IBC. For example, when the slave device 200 is the memory device, the master device 100 may perform read operation or write operation on the memory cells included in the slave device 200 through the in-band channel IBC. Similarly, when the slave device 200 is the graphic processing device, the master device 100 may control the operation of the ALU included in the slave device 200 through the in-band channel IBC.

In an embodiment, the in-band channel IBC may be implemented based on one of peripheral component interconnect express (PCIe), double data rate (DDR), serial advanced technology attachment (SATA), and nonvolatile memory express (NVMe) protocols. However, the scope of the present disclosure is not limited thereto.

In an embodiment, when the slave device 200 is memory device, the master device 100 may transmit a command and an address to the slave device 200 through the in-band channel IBC. In this case, the slave device 200 may transmit data stored in the memory cells included in the slave device 200 to the master device 100 through then in-band channel IBC, or store the data provided through the in-band channel IBC in the memory cell included in the slave device 200, in response to the received command and address. For a more detailed example, when the slave device 200 is the solid state drive (SSD), the master device 100 may transmit a nonvolatile memory express command (NMVe command) through the in-band channel IBC.

The slave device 200 may be implemented to transmit vital production data (VPD) to the master device 100 through an out-of-band channel OOBC. For example, the master device 100 may transmit a VPD request to the slave device 200 through the out-of-band channel OOBC, and the slave device 200 may transmit the VPD request to the master device 100 through out-of-band channel OOBC in response to the VPD request.

In an embodiment, the out-of-band channel OOBC may be implemented based on one of inter integrated circuit (I2C), improved inter integrated circuit (13C), system management bus (SMBus), and universal asynchronous receiver/transmitter (UART) protocols. However, the scope of the present disclosure is not limited thereto.

The communication speed of the in-band channel IBC may be faster than communication speed of the out-of-band channel OOBC. For example, the frequency of the clock signal used for communication over the in-band channel IBC may be higher than a frequency of a clock signal used for communication through the out-of-band channel OOBC.

In an embodiment, the communication speed of the out-of-band channel OOBC may be 10 Mbit/s or less.

The master device 100 may transmit the device status request REQ_DS to the slave device 200 through the in-band channel IBC or the out-of-band channel OOBC. However, hereinafter, for a more concise description, an embodiment in which the master device 100 transmits the device status request REQ_DS to the slave device 200 through the out-of-band channel OOBC has been representatively described. However, the scope of the present disclosure is not limited thereto.

The slave device 200 may transmit the device status response RSP_DS to the master device 100 through the in-band channel IBC or the out-of-band channel OOBC. Hereinafter, for a more concise description, an embodiment in which the slave device 200 transmits the device status response RSP_DS to the master device 100 through the out-of-band channel OOBC has been representatively described. However, the scope of the present disclosure is not limited thereto.

The status manager 210 may be directly connected to the baseboard management circuit 110 through the out-of-band channel OOBC. That is, according to an embodiment of the present disclosure, the status manager 210 may be directly connected to the out-of-band channel OOBC without passing through the device controller 230. However, the scope of the present disclosure is not limited to the specific manner in which the status manager 210 is connected to the out-of-band channel OOBC. For example, the status manager 210 may be connected to the out-of-band channel OOBC through the device controller 230. However, for a more concise description, hereinafter, an embodiment in which the status manager 210 is directly connected to the baseboard management circuit 110 through the out-of-band channel OOBC has been representatively described.

The baseboard management circuit 110 may directly transmit the device status request REQ_DS to the status manager 210 through the out-of-band channel OOBC. That is, the device status request REQ_DS may be provided directly to the status manager 210 without passing through the central processing unit 120 and the device controller 230.

In an embodiment, when the slave device 200 is the SSD, the baseboard management circuit 110 may transmit the device status request REQ_DS in the NVMe-MI message format. However, the scope of the present disclosure is not limited thereto.

The status manager 210 may directly transmit the device status response RSP_DS to the baseboard management circuit 110 through the out-of-band channel OOBC. In this case, the device status response RSP_DS may be provided directly to the baseboard management circuit 110, without passing through the central processing unit 120 and device controller 230.

In an embodiment, when the slave device 200 is the SSD, the status manager 210 may transmit the device status response RSP_DS in the NVMe-MI message format. However, the scope of the present disclosure is not limited thereto.

In an embodiment, when the baseboard management circuit 110 and the status manager 210 are directly connected through the out-of-band channel OOBC, even if defects occur in the device controller 230, the status manager 210 may communicate with the baseboard management circuit 110 through the out-of-band channel OOBC. For example, even if defects occur in the device controller 230, the status manager 210 may transmit the device status records DSR to the baseboard management circuit 110. In this case, the baseboard management circuit 110 may be able to cure the defects in the slave device 200 or minimize the probability of defects occurring in the slave device 200 based on the received device status records DSR.

In an embodiment, when the master device 100 and the slave device 200 exchange the device status records through the out-of-band channel OOBC, data transmitted to perform the main operation of the slave device 200 may be transmitted through a different channel than the device status records. For example, when the slave device 200 is the memory device, even while the device status request REQ_DS and the device status response RSP_DS are exchanged, the master device 100 may be able to perform read operation or write operation on the slave device 200 through the in-band channel IBC. Therefore, according to an embodiment of the present disclosure, the operation performance of the communication system CMS may be improved. However, the scope of the present disclosure is not limited thereto.

Figure 16:
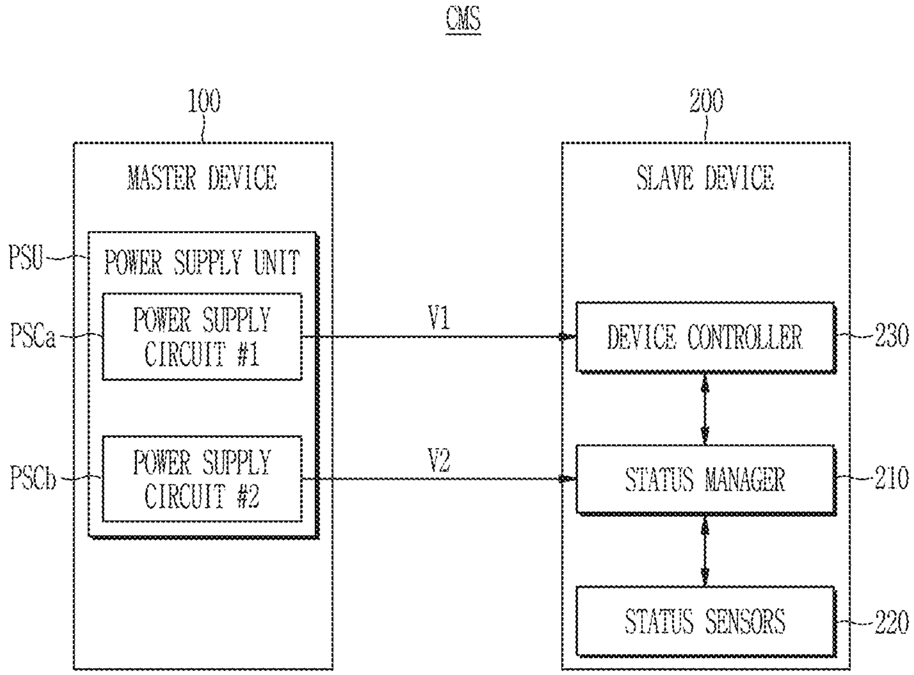
FIG. 16 is a block diagram illustrating the communication system of FIG. 15.

FIG. 16 is a block diagram illustrating the communication system of FIG. 15. Referring to FIGS. 1 to 16, the slave device 200 may include the status manager 210, the device status sensor 220, and the device controller 230. The configuration and operation of the slave device 200 are similar to those described above, and therefore, detailed description thereof will be omitted.

The master device 100 may include a power supply unit PSU. The power supply unit PSU may include a first power supply circuit PSCa and a second power supply circuit PSCb.

The first power supply circuit PSCa may provide a first power voltage V1 to the device controller 230. The second power supply circuit PSCb may provide a second power voltage V2 to the status manager 210. In this case, the second power voltage V2 may have a voltage level equal to or lower than the first power voltage V1.

In an embodiment, the first power voltage V1 may be 12V or 3.3V. However, the scope of the present disclosure is not limited thereto.

In an embodiment, the second power voltage V2 may be 3.3V. However, the scope of the present disclosure is not limited thereto.

In an embodiment, the first power supply circuit PSCa and the second power supply circuit PSCb may operate independently of each other. For example, even if defects occur in the first power supply circuit PSCa, the second power supply circuit PSCb may provide the second power supply voltage V2 to the status manager 210. Therefore, according to an embodiment of the present disclosure, even if defects occurs in the first power supply circuit PSCa, the master device 100 and the slave device 200 may communicate with each other through the out-of-band channel OOBC.

Figure 17:
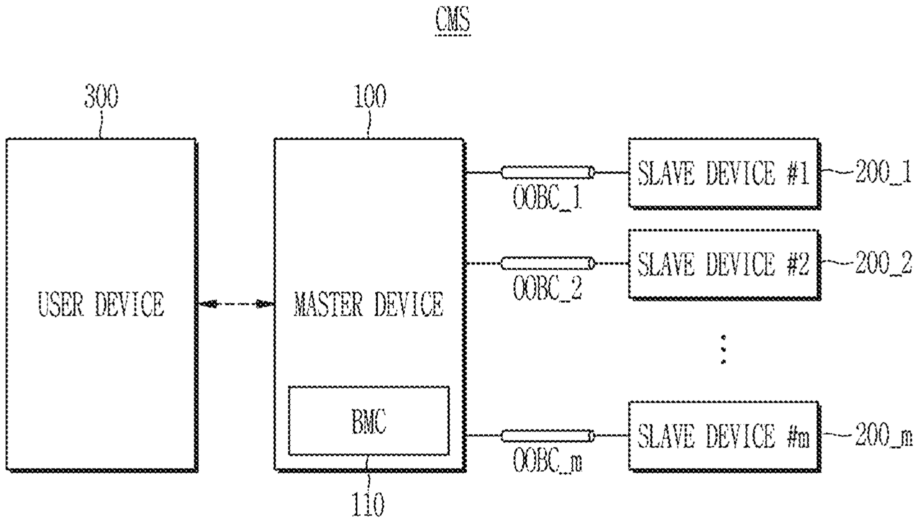
FIG. 17 is a block diagram illustrating the communication system according to an embodiment.

FIG. 17 is a block diagram illustrating the communication system according to an embodiment. Referring to FIGS. 1 to 17, the communication system CMS may include the master device 100, first to m-th slave devices 200_1 to **200_*m*, and a user device 300**.

The master device 100 may be a server device. In this case, the master device 100 may communicate with the user device 300 through a network interface. That is, the communication system CMS may be a server system that operates in response to a request from the user device 300.

The master device 100 may control the first to m-th slave devices 200_1 to **200_*m* based on the request from the user device 300. For example, when the first to m-th slave devices 200_1 to 200_*m* are the memory device, the master device 100 may store data provided from the user device 300 in the first to m-th slave devices 200_1 to 200_*m***.

In an embodiment, the user device 300 may be any type of electronic device that provides a user interface, such as a desktop, a tablet PC, a laptop, and a smartphone. However, the scope of the present disclosure is not limited thereto.

The master device 100 may be connected to each of the first to m-th slave devices 200_1 to **200_*m* through first to m-th out-of-band channels OOBC_1 to OOBC_m. For example, the master device 100 may be connected to the first slave device 200_1 through the first out-of-band channel OOBC_1**.

The master device 100 may include the baseboard management circuit 110. The baseboard management circuit 110 may collect device status records DSR from each of the first to m-th slave devices 200_1 to **200_*m* in the manner described above with reference to FIGS. 1 to 15. For example, the baseboard management circuit 110 may transmit the device status request REQ_DS to each of the first to m-th slave devices 200_1 to 200_*m* through the out-of-band channel. In this case, each of the first to m-th slave devices 200_1 to 200_*m* may transmit the device status records DSR to the master device 100** through the device status response RSP_DS.

The baseboard management circuit 110 may manage the status of the first to m-th slave devices 200_1 to **200_*m*. For example, the baseboard management circuit 110 may control the operation of the first to m-th slave devices 200_1 to 200_*m* based on the device status records DSR provided from each of the first to m-th slave devices 200_1 to 200_*m*. For example, when the device status records DSR provided from the first slave device 200_1 represents an excessively high temperature, the baseboard management circuit 110 may control the master device 100 to store the data received from the user device 300 in the second slave device 200_2 instead of the first slave device 200_1**. However, the scope of the present disclosure is not limited thereto.

Figure 18:
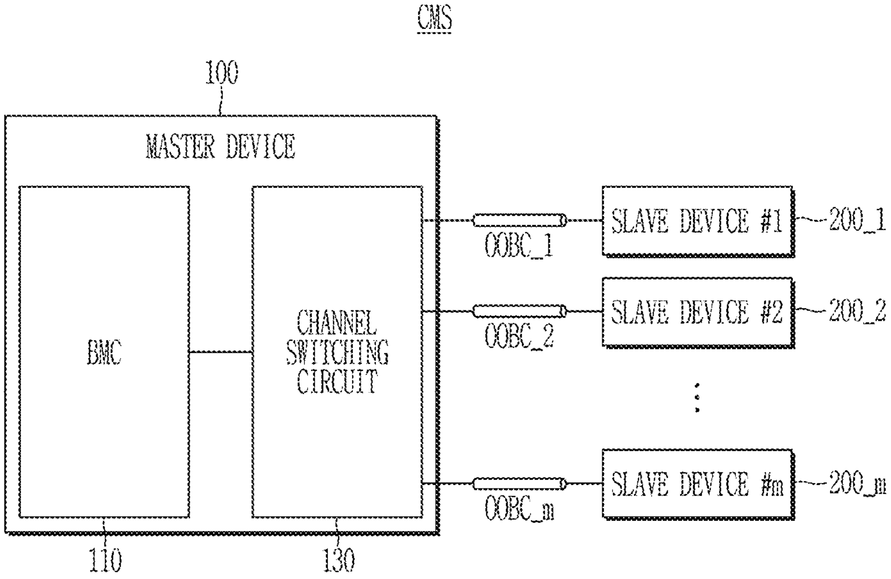
FIG. 18 is a block diagram illustrating in more detail some of the components of FIG. 17.

FIG. 18 is a block diagram illustrating in more detail some of the components of FIG. 17. Referring to FIGS. 1 to 18, the master device 100 may include the baseboard management circuit 110 and a channel switching circuit 130. The channel switching circuit 130 may be connected to the baseboard management circuit 110 and the first to m-th out-of-band channels OOBC_1 to OOBC_m.

The channel switching circuit 130 may connect the baseboard management circuit (BMC) to one of the first to m-th out-of-band channels OOBC_1 to OOBC_m in response to the control of the baseboard management circuit 110. That is, the baseboard management circuit 110 may communicate with one of the first to m-th slave devices 200_1 to **200_*m* through the channel switching circuit 130**.

The channel switching circuit 130 may sequentially connect each of the first to m-th out-of-band channels OOBC_1 to OOBC_m to the baseboard management circuit 110 in a round robin manner. In this case, the baseboard management circuit 110 may transmit the device status request REQ_DS to each of the first to m-th slave devices 200_1 to **200_*m*** in the round-robin manner.

For example, the baseboard management circuit 110 may transmit the full-device status request REQ_DS_full to the first out-of-band channel OOBC_1 and then transmit the full-device status request REQ_DS_full to the second out-of-band channel OOBC_2. In this way, the baseboard management circuit 110 may sequentially transmit the full-device status request REQ_DS_full to the first to m-th out-of-band channels OOBC_1 to OOBC_m. In this case, the baseboard management circuit 110 may sequentially receive the device status response RSP_DS having the first response type RSPT1 from the first to m-th slave devices 200_1 to **200_*m***.

Thereafter, the baseboard management circuit 110 may sequentially transmit the update-device status request REQ_DS_update to the first to m-th out-of-band channels OOBC_1 to OOBC_m with round-robin manner. In this case, the baseboard management circuit 110 may sequentially receive the device status response RSP_DS having the first response type RSPT1 or the second response type RSPT2 from each of the first to m-th slave devices 200_1 to **200_*m***.

In an embodiment, compared to case where all of the first to m-th out-of-band channels OOBC_1 to OOBC_m transmit the device status response RSP_DS having the first response type RSPT1 to the master device 100, in case where some of the first to m-th out-of-band channels OOBC_1 to OOBC_m transmit the device status response RSP_DS having the second response type RSPT2 to the master device 100, the response packet with less capacity may be provided to the master device 100. In this case, an average length of time for the channel switching circuit 130 to connect each of the first to m-th out-of-band channels OOBC_1 to OOBC_m to the baseboard management circuit 110 may be reduced. Therefore, according to an embodiment of the present disclosure, the baseboard management circuit 110 may transmit the device status request REQ_DS to the first to m-th slave devices 200_1 to **200_*m* at shorter time intervals. In addition, according to an embodiment of the present disclosure, even if the master device 100 receives the device status records DSR based on the out-of-band channel OOBC which has a slower communication speed than the in-band channel IBC, the master device 100 will be able to receive the device status response RSP_DS from each of the first to m-th slave devices 200_1 to 200_*m* at sufficiently short time intervals. In this case, since the baseboard management circuit 110 may more accurately manage the device status records of the first to m-th slave devices 200_1 to 200_*m*, the management efficiency of the first to m-th slave devices 200_1 to 200_*m* of the baseboard management circuit 110** may be improved.

The foregoing are specific embodiments for carrying out the present disclosure. The present disclosure will include not only the above-described embodiments, but also embodiments that can be changed in design. In addition, the present disclosure will also include technologies that can be modified and implemented using embodiments. Therefore, the scope of the present disclosure should not be limited to the above-described embodiments and should be defined by not only the claims to be described later but also those equivalents to the claims of the present disclosure.

What is claimed is:

1. A method of operating a slave device configured to communicate with a master device and to store a plurality of status flags respectively corresponding to a plurality of device status records, the method comprising:

receiving a first device status request from the master device;

determining a packet capacity of a first device status response based on whether each status flag of the plurality of status flags has a first value;

generating the first device status response in response to the first device status request; and transmitting the first device status response to the master device.

2. The method of claim 1, wherein the determining the packet capacity of the first device status response further comprises:

based on each status flag of the plurality of status flags having the first value, determining that the packet capacity is a first capacity; and based on one or more status flags among the plurality of status flags having a second value different from the first value, determining that the packet capacity is a second capacity different from the first capacity.

3. The method of claim 1, wherein each of the plurality of device status records comprises one of:

hardware telemetry information representing a hardware status of the slave device;

firmware telemetry information representing a firmware status of the slave device; and NAND telemetry information representing a status of a non-volatile memory device included in the slave device.

4. The method of claim 1, wherein the first device status response comprises a response status code representing a response type of the first device status response, and wherein, when the response status code represents a first response type having the first capacity, the first device status response comprises one or more of the plurality of device status records.

5. The method of claim 4, wherein, when the first device status response has the first response type, the first device status response comprises all of the plurality of device status records.

6. The method of claim 4, wherein, when the first device status response has the first response type, the first device status response comprises:

one or more device status records, which are a subset of the plurality of device status records, the one or more device status records having the second value.

7. The method of claim 2, wherein the plurality of device status records corresponds to a plurality of status values and a plurality of reference ranges, respectively, wherein, for each of the plurality of device status records, based on the corresponding status value among the plurality of status values being within a corresponding reference range among the plurality of reference ranges, a corresponding status flag has the first value; and wherein, for each of the plurality of device status records, based on the corresponding status value among the plurality of status values not being within the corresponding reference range among the plurality of reference ranges, the corresponding status flag has the second value.

8. The method of claim 1, wherein the first device status request is received from the master device through an out-of-band channel, and wherein the first device status response is transmitted to the master device through the out-of-band channel.

9. The method of claim 8, wherein the out-of-band channel is implemented based on at least one of an inter integrated circuit (I2C) protocol, an improved inter integrated circuit (I3C) protocol, a system management bus (SMBus) protocol, and a universal asynchronous receiver/transmitter (UART) protocol.

10. The method of claim 8, wherein the slave device comprises a solid state drive (SSD), and wherein the first device status request and the first device status response comprise a nonvolatile memory express management interface (NVMe-MI) message format.

11. The method of claim 10, wherein the slave device further comprises a memory cell, and wherein the method further comprises performing a read operation and a write operation on the memory cell in response to a control of the master device through an in-band channel different from the out-of-band channel.

12. The method of claim 10, wherein a communication speed of an in-band channel is higher than a communication speed of the out-of-band channel.

13. An electronic device including a memory cell and configured to communicate with an external device through an in-band channel and an out-of-band channel, the electronic device comprising:

a plurality of status sensors configured to generate a plurality of status values;

a status manager storing a plurality of device status records respectively including the plurality of status values; and a device controller configured to perform a read operation or a write operation on the memory cell in response to a command received through the in-band channel, wherein the status manager is configured to execute one or more instructions which cause the electronic device to:

based on receiving a first device status request from the external device through the out-of-band channel, output to the external device through the out-of-band channel a first device status response representing that each of the plurality of device status records is normal, and based on receiving a second device status request from the external device through the out-of-band channel, output to the external device through the out-of-band channel a second device status response which includes one or more of the plurality of device status records and which has a packet capacity larger than the first device status response.

14. The electronic device of claim 13, wherein each of the plurality of device status records comprises one of:

hardware telemetry information representing a hardware status of the electronic device;

firmware telemetry information representing a firmware status of the electronic device; and NAND telemetry information representing a status of a non-volatile memory device included in the electronic device.

15. The electronic device of claim 13, wherein the first device status request and the second device status request comprises same operation code.

16. The electronic device of claim 13, wherein the status manager also stores a plurality of reference ranges and a plurality of status flags respectively corresponding to the plurality of status values, and wherein the status manager is further configured to execute the one or more instructions which cause the electronic device to:

for each of the plurality of device status records, based on the corresponding status value among the plurality of status values being within a corresponding reference range among the plurality of reference ranges, set a corresponding status flag from among the plurality of status flags to a first value, and for each of the plurality of device status records, based on the corresponding status value among the plurality of status values not being within the corresponding reference range among the plurality of reference ranges, set the corresponding status flag from among the plurality of status flags to a second value.

17. The electronic device of claim 16, wherein the status manager is further configured to execute the one or more instructions which cause the electronic device to:

based on each status flag of the plurality of status flags being the first value, output the first device status response in response to the first device status request.

18. The electronic device of claim 13, wherein a communication speed of the in-band channel is higher than a communication speed of the out-of-band channel.

19. A method of operating an electronic device configured to communicate with an external device and storing a plurality of device status records, the method comprising:

receiving, from the external device, a first device status request comprising a first operation code;

transmitting, in response to the first device status request, a first device status response having a first packet capacity, wherein the first device status response represents that the plurality of device status records are normal;

receiving, from the external device, a second device status request comprising the first operation code; and transmitting, in response to the second device status request, a second device status response having a second packet capacity larger than the first packet capacity, wherein the second device status response comprises one or more of the plurality of device status records.

20. The method of claim 19, wherein each of the plurality of device status records comprises telemetry information used to predict lifespan of the electronic device or defect occurrence of the electronic device.

* * * * *